(12) United States Patent
Taylor

(10) Patent No.: US 6,745,549 B1
(45) Date of Patent: Jun. 8, 2004

(54) WHEELED ATTACHMENT FOR GRASS TRIMMER

(76) Inventor: Joseph C. Taylor, 267 Fraser St., Clinton, AR (US) 72031

( * ) Notice: Subject to any disclaimer, the term of this patent is extended or adjusted under 35 U.S.C. 154(b) by 0 days.

(21) Appl. No.: 10/391,085

(22) Filed: Mar. 18, 2003

(51) Int. Cl.$^7$ ............................................... A01D 34/84
(52) U.S. Cl. ........................................ 56/12.7; 56/17.2
(58) Field of Search ................................. 56/12.7, 16.7, 56/17.1, 17.2

(56) References Cited

U.S. PATENT DOCUMENTS

| | | | |
|---|---|---|---|
| 498,533 A | | 5/1893 | Clousing |
| 970,751 A | | 9/1910 | Pranke |
| 1,467,212 A | * | 9/1923 | Walsh .................... 56/400.14 |
| 3,017,733 A | | 1/1962 | Evans |
| 3,034,275 A | | 5/1962 | Happe et al. |
| 3,077,718 A | | 2/1963 | McLaughlin |
| 3,123,378 A | | 3/1964 | Caldwell |
| 4,033,098 A | | 7/1977 | Green |
| 4,043,101 A | | 8/1977 | Lahr et al. |
| 4,077,191 A | | 3/1978 | Pittinger, Sr. et al. |
| 4,182,100 A | * | 1/1980 | Letter .......................... 56/16.7 |
| 4,224,784 A | | 9/1980 | Hansen et al. |
| 4,287,709 A | | 9/1981 | Lowry et al. |
| 4,341,060 A | | 7/1982 | Lowry et al. |
| 4,343,139 A | | 8/1982 | Lowry et al. |
| 4,351,143 A | | 9/1982 | Lessig, III |
| 4,389,836 A | | 6/1983 | Lowry et al. |
| 4,411,126 A | | 10/1983 | Lowry et al. |
| 4,442,659 A | | 4/1984 | Enbusk |
| 4,512,143 A | | 4/1985 | Jimenez |
| 4,531,350 A | | 7/1985 | Huthmacher |
| 4,587,800 A | | 5/1986 | Jimenez |
| 4,688,376 A | | 8/1987 | Wolfe, Sr. |
| 4,704,849 A | | 11/1987 | Gilbert et al. |
| 4,756,147 A | | 7/1988 | Savell |
| 4,829,755 A | | 5/1989 | Nance |
| 4,845,929 A | | 7/1989 | Kawasaki et al. |
| 4,873,819 A | | 10/1989 | Shivers et al. |
| 4,879,869 A | | 11/1989 | Buckendorf, Jr. |
| 4,891,931 A | | 1/1990 | Holland |
| 4,894,916 A | | 1/1990 | Nimz et al. |
| 4,922,694 A | | 5/1990 | Emoto |
| 4,936,886 A | | 6/1990 | Quillen |
| 5,092,112 A | | 3/1992 | Buckendorf, Jr. |
| 5,095,687 A | | 3/1992 | Andrew et al. |
| 5,222,750 A | | 6/1993 | Ellis |
| 5,279,102 A | | 1/1994 | Foster |
| 5,450,715 A | | 9/1995 | Murray |
| 5,467,584 A | | 11/1995 | Boyles |
| 5,477,665 A | * | 12/1995 | Stout .......................... 56/16.7 |
| 5,561,969 A | * | 10/1996 | Sandy ......................... 56/13.6 |
| 5,603,205 A | | 2/1997 | Foster |
| 5,829,236 A | | 11/1998 | Ballard et al. |
| 5,970,692 A | | 10/1999 | Foster |
| 6,009,694 A | | 1/2000 | Moore et al. |
| 6,065,275 A | | 5/2000 | Pope |

* cited by examiner

Primary Examiner—Thomas B. Will
Assistant Examiner—Meredith Petravick
(74) Attorney, Agent, or Firm—J. Charles Dougherty

(57) ABSTRACT

The attachment comprises a resilient member in communication between the wheel of the attachment and the weed trimmer shaft, which reduces vibration experienced by the weed trimmer operator. The resilient member further allows the operator to tap the trimmer head against the ground to release additional trimming line in a normal fashion as if the wheeled attachment were not in use.

3 Claims, 2 Drawing Sheets

WHEELED ATTACHMENT FOR GRASS TRIMMER

BACKGROUND OF THE INVENTION

The present invention relates to grass trimmer attachments, and in particular to a grass trimmer attachment that reduces operator strain caused by prolonged trimmer use while not interfering with the ability of an operator to easily extend trimmer line during operation.

Weed trimmers are in common use throughout the United States and many other countries today. The cutting action of these devices is typically provided by the high speed rotation of one or more lengths of monofilament polymer trimming line. The primary use for these devices is the cutting of grass and weeds in areas where the large size and limited maneuverability of traditional lawn mowers may render such machines impractical. Many weed trimmers may also be used for lawn edging, either by the employment of special attachments or the rotation of the grip used to hold the trimmer. Weed trimmers typically consist of a motor unit, which may Include either a gasoline-driven or electric motor; a support shaft; and a trimmer head at the opposite end of the support shaft from the motor unit. A drive connection passing through the shaft allows the motor unit to drive the trimmer head. The support shaft may be straight or curved, and may include a handle part-way along its length by which the owner may control the movement of the trimmer head. The trimmer head is comprised of a rotating disc from which a length of trimming line extends, which during operation spins to form a circular cutting pattern. A guard is often mounted above the trimmer head to protect the operator from accidentally placing a hand or foot in the arc of the spinning trimmer line. In addition, many weed trimmers include a mechanism within the trimmer head that extends line automatically when the trimmer head Is tapped against a surface such as the ground. In such devices, trimming line is stored within the spinning trimmer head on a spool, and is extended by depressing a spring-loaded button extending from the bottom of the trimmer head. This line extension mechanism is of great convenience to the operator, as It allows the operator to extend additional line while continuing the operation of the trimmer. The line typically used in such trimmers is lightweight and easily broken if it strikes rocks, concrete, edging materials, and other common yard obstacles, and thus line extension is periodically required during operation.

Muscle strain, aches, and numbness are common complaints of those persons who use weed trimmers for prolonged periods. Most of these devices are intended to be supported by the operator during use, which increases the maneuverability of the device. While some weed trimmers include slings that are placed across the operators shoulders, many are intended to be supported by simply holding the device with both hands. It is believed that the symptoms experienced by weed trimmer operators arise partly due to the fact that the weed trimmer head, which forms a significant portion of the weed trimmer weight, is cantilevered far out on the end of the support shaft, away from the operator. This weighted portion must of course be turned and repositioned constantly during operation so that trimmer line may be applied to the appropriate areas where vegetation is to be cut. Furthermore, the operator must periodically tap the trimmer head onto the ground in order to feed additional line, which increases operator strain. It is also believed that the vibration common to all weed trimmers, which results from the rotational operation of the motor, is largely responsible for the numbness often experienced by weed trimmer operators. This vibration may be transmitted directly to the operators hands and arms through the weed trimmer's rigidly attached handles.

One potential remedy for the muscle strain caused by the prolonged use of weed trimmers is to provide a wheeled carriage or support mechanism. The use of wheeled carriage assemblies in order to support grass trimmers is known in the art. For example, U.S. Pat. No. 6,009,694 to Moore et al. teaches a wheeled carriage assembly for supporting a grass trimmer that includes a large rear wheel and a pair of front wheels mounted on a rigid assembly, with a pair of handlebars extending rearwardly from the weed trimmer motor unit U.S. Pat. No. 5,970,692 to Foster teaches a weed trimmer carriage with a single, large support wheel mounted rigidly to the weed trimmer support shaft, with a control bar extending upwardly from the carriage mounting point. U.S. Pat. No. 5,829,236 to Ballard et al. teaches a wheeled carrier for a grass trimmer comprising a rigid frame and three ground-engaging wheels. The frame of the Ballard et al. device mounts to the shaft of the weed trimmer just below the motor unit and just below a handle that is mounted approximately half-way down the shaft to the trimmer head. U.S. Pat. No. 5,095,687 to Andrew et al. teaches a weed trimmer wheel assembly with a single ground-engaging wheel that mounts to the weed trimmer at two points, namely, the weed trimmer support shaft and the rearward portion of the guard extending rearwardly from the weed trimmer head assembly.

Each of the prior art devices in this field provide wheeled support for a weed trimmer in an attempt to relief some of the strain experienced by weed trimmer operators. None of these prior art devices, however, provide a means of significantly reducing the motor vibration transmitted to the operator's hands and arms while holding a weed trimmer. The rigid frames and mounting assemblies used by the prior art devices simply transmit this vibration to the user directly, or at best do nothing to dampen this vibration. In fact, some of these devices may in fact worsen the effects of vibration because the operator's grip is repositioned further from the source of the vibration, thereby increasing the perceived vibration amplitude at the point where the operator grips the carriage or attachment.

In addition, none of the prior art devices are mounted to the weed trimmer in such a manner as not to interfere with the extension of additional line from the weed trimmer head by tapping of the weed trimmer head upon the ground. For those devices that use both front and rear wheels, it would seem impossible to tap the head of the weed trimmer during operation without removing the rear set of wheels from the ground. This would defeat the purposes for which the carriage or attachment is provided, and may create a dangerous condition in which the weed trimmer and carriage unit may tip over, exposing the rotating trimmer head. For those weed trimmer carriages or attachments with only a single wheel, or a single set of wheels set on an axis perpendicular to that of the support shaft of the weed trimmer, tapping of the trimmer head to extend line would also be awkward. In order to perform this operation, the operator would be required to pivot the motor unit end of the weed trimmer in a large arc about the axis of the wheels. The difficulty of this maneuver would increase as the wheel axis is moved closer to the trimmer head and further from the motor unit. Even if this maneuver would be possible, the trimmer head would not be striking the ground with its face parallel to the ground surface. If the angle between the hub and ground is too great, the button on the trimmer head would not be sufficiently depressed, and the trimmer head would not release more line. Even if this angle is not too great to prevent operation of the hub line-release mechanism, greater force would be required for this operation when the hub is not parallel to the ground, which would increase strain upon the operator and would likely reduce the operational life of the trimmer head.

What is desired then is a weed trimmer wheeled attachment that relieves both stress and vibration experienced by the operator, but does not interfere with the normal operation of the weed trimmer, including the extension of additional line from the trimmer head by tapping the head of the trimmer upon the ground. The limitations of the prior art in this regard are overcome by the present invention as described below.

BRIEF SUMMARY OF THE INVENTION

The present invention is directed to a weed trimmer wheeled attachment that comprises a resilient member in communication between the weed trimmer and wheeled portion of the device. In the preferred embodiment this resilient member comprises a coiled spring, although the invention is not so limited. The resilient member acts to both dampen vibration experienced by the weed trimmer operator and allow the operator to easily tap the weed trimmer head upon the ground to enable the release of additional trimming line. By simply applying light pressure downwardly as the operator holds the weed trimmer, the resilient member is compressed to allow the weed trimmer head hub to tap the ground, thereby releasing trimming line. The user's operation of the trimmer is in no way interrupted by this simple operation, which is no more complicated than the release of additional line when the trimmer is used without the attachment. Since the resilient member allows the trimmer head to travel downward in a direction perpendicular to the ground, the problems created by the striking of the trimmer head to the ground at an angle as necessary with some other wheeled attachments are not presented.

The present invention further comprises pivoting means in communication with the wheeled portion such that the weed trimmer head may be moved in any direction, just as when no attachment is in place. In a preferred embodiment, this pivoting means may comprise a rotatable strut, although the invention is not so limited. Because of the compact size of the present invention, it does not limit the maneuverability of the weed trimmer or limit the areas that may be reached with the weed trimmer. Furthermore, the means by which the present invention may be attached to a trimmer is highly configurable, allowing its use on virtually any weed trimmer design or brand. Because the present invention may be mounted at any point along the support shaft of the weed trimmer, it may be used both with weed trimmers that have straight support shafts and those that have curved support shafts. The present invention is lightweight, and thus does not impede the portability of the weed trimmer as it is carried in a non-operational posture from storage to a work area or between work areas. The present invention is relatively simple in design with few moving parts, which increases its reliability and longevity. The present invention is also simple and inexpensive to manufacture, which increases its desirability to manufacturers and to consumers who may not be willing to spend significant sums on an attachment to a weed trimmer that itself may not be inexpensive. The present invention may also be easily removed for use in conjunction with other yard tools and equipment comprising a long shaft with a weighted end, such as handheld metal detectors, thereby increasing its utility.

It is therefore an object of the present invention to provide for a wheeled weed trimmer attachment that functions to dampen the vibration experienced by a weed trimmer operator, thereby relieving the numbness and aching often experienced as a result of prolonged weed trimmer use.

It is a further object of the present invention to provide for a wheeled weed trimmer attachment that does not interfere with the normal operation of the weed trimmer, which includes the tapping of the weed trimmer head upon the ground in order to release additional trimming line.

It is also an object of the present invention to provide for a wheeled weed trimmer attachment that allows the weed trimmer head to be easily moved in any direction.

It is another object of the present invention to provide for a wheeled weed trimmer attachment of compact size such as not to limit the maneuverability of the weed trimmer or limit the areas that may be reached with the weed trimmer.

It is another object of the present invention to provide for a wheeled weed trimmer attachment that is highly configurable, allowing its use on virtually any weed trimmer design or brand.

It is another object of the present invention to provide for a wheeled weed trimmer attachment that is lightweight, and thus does not impede the portability of the weed trimmer as it is carried in a non-operational posture from storage to a work area or between work areas.

It is another object of the present invention to provide for a wheeled weed trimmer attachment that is relatively simple in design with few moving parts, thereby increasing the reliability and longevity of the attachment.

It is another object of the present invention to provide for a wheeled weed trimmer attachment that is simple and inexpensive to manufacture.

These and other features, objects and advantages of the present invention will become better understood from a consideration of the following detailed description of the preferred embodiments and appended claims in conjunction with the drawings as described following:

DETAILED DESCRIPTION OF THE INVENTION

Figure 1:
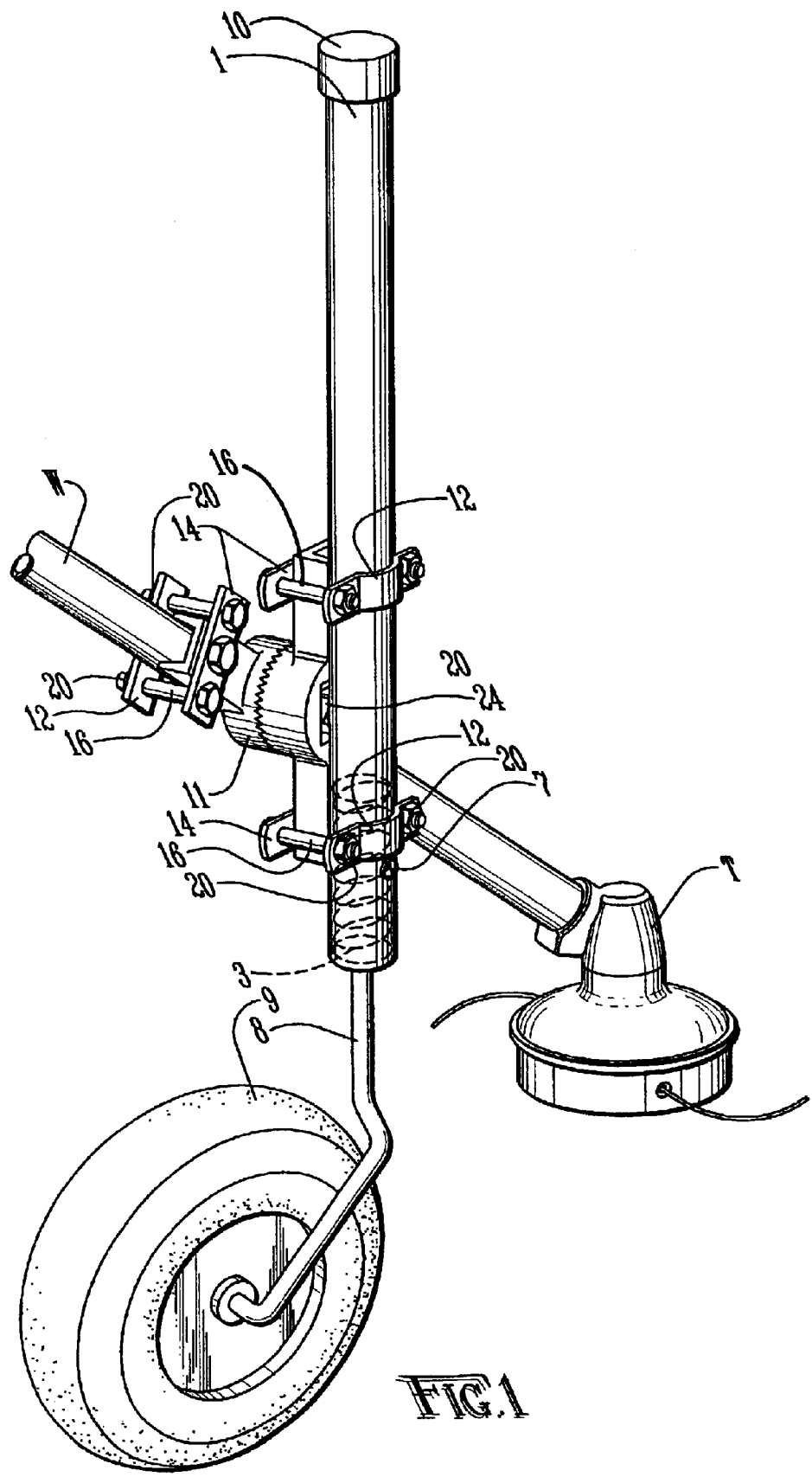
FIG. 1 is a perspective view of a weed trimmer (shown in dotted lines) with the preferred embodiment of the present invention mounted thereto.
Figure 2:
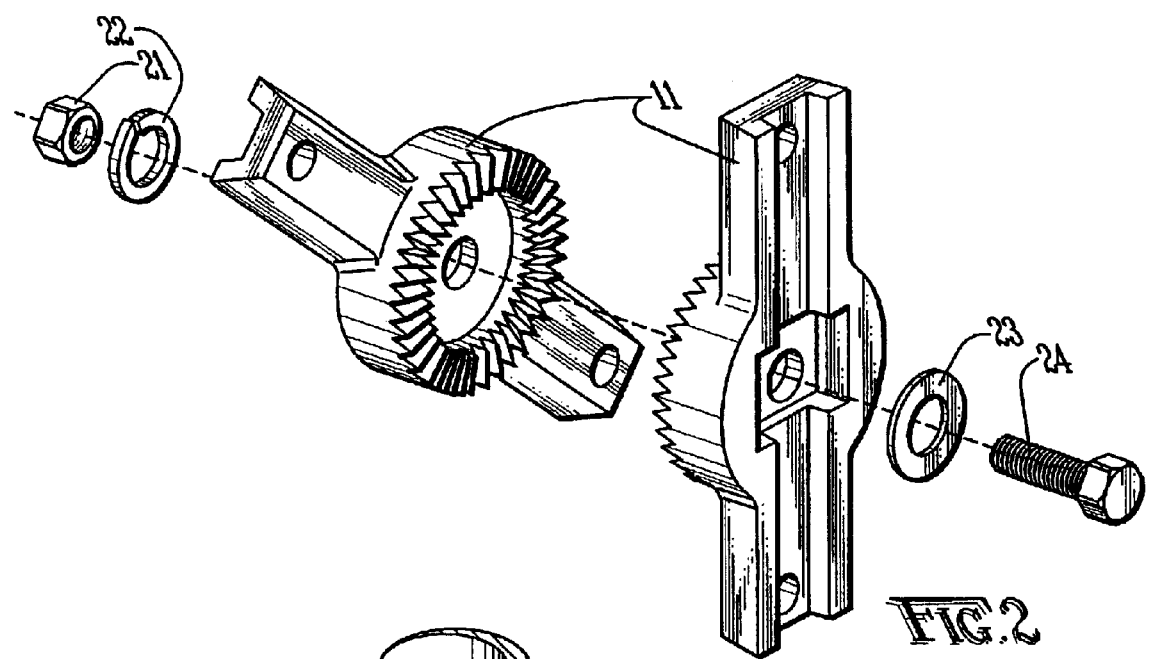
FIG. 2 is a partial cut-away view of the coil spring mechanism of the preferred embodiment of the present invention.
Figure 3:
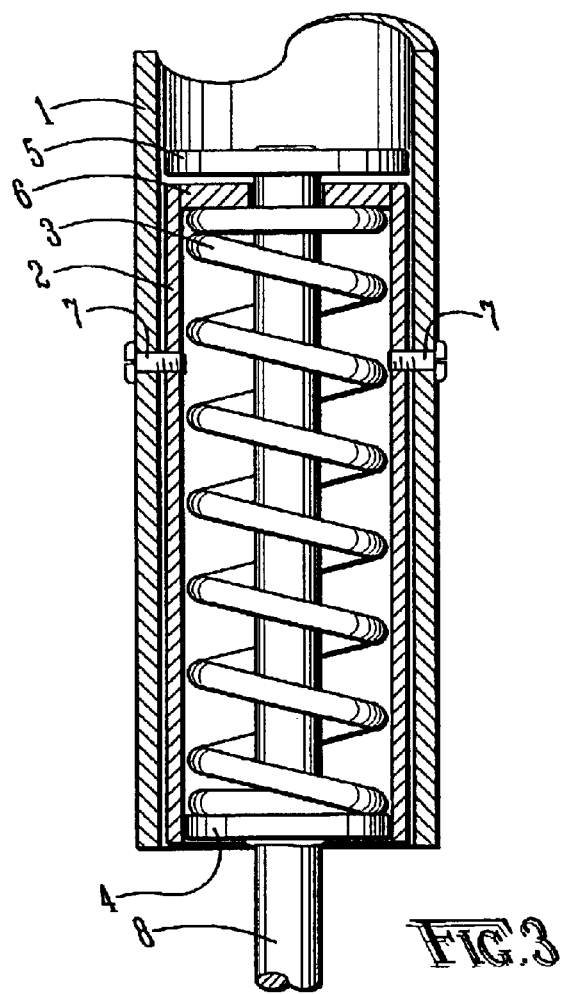
FIG. 3 is an exploded view of the preferred embodiment of the present invention.

With reference to FIGS. 1–3, the preferred embodiment of the present invention may be described. Attachment shaft 1 is hollow, and preferably is formed of a strong, lightweight material such as aluminum. Aluminum offers the additional advantages that it does not require painting to prevent rusting, and that it will match well with most existing weed trimmers whose support shafts are also constructed of aluminum. In the preferred embodiment, a cap 10 fits over the top of attachment shaft 1 to prevent dirt, grass, and other foreign materials from entering attachment shaft 1 through its top during the operation of weed trimmer T.

Cylinder 2, also preferably formed of steel or another strong, lightweight material that may be welded, is circumferentially fitted within the lower end of attachment shaft 1. Cylinder 2 must of course have an outer diameter that is equal to or less than the inner diameter of attachment shaft 1, but preferably cylinder 2 is a snug fit within attachment shaft 1. Cylinder top 6 is attached (preferably welded) to cylinder 2 at its upper end, resulting in a canister shape having a smaller hole at the top than at the bottom. Cylinder top 6 may preferably be formed of a washer that is of appropriate diameter to match the diameter of cylinder 6. Cylinder 2 is held in place at the proper position in the lower end of attachment shaft 1 by two set screws 7, which pass through holes in the sides of attachment shaft 1. Cylinder 2 could alternatively be held in place within attachment shaft 1 by several other means that are well-known in the art. Alternatively, cylinder top 6 could be welded directly to the inside of attachment shaft 1 thereby eliminating the requirement of including cylinder 2 altogether, although the preferred embodiment includes cylinder 2 for ease of manufacturing.

Coil spring fits into cylinder 2 from the bottom and is pressed against the bottom side of cylinder top 6. Coil spring 3 is preferably formed of steel or another appropriately resilient material, and preferably is of a sufficient diameter such that it snugly fits within cylinder 2. Coil spring 3 should ideally be of a length approximately the same as that of cylinder 2 when uncompressed, but coil spring 3 could be made shorter in order to provide a spring of appropriate force constant as will be explained below.

Strut 8 is preferably formed of a solid, strong material such as steel. The upper vertical portion of strut 8 passes through cylinder top 6, with the upper end of strut 8 protruding through and past the top side of cylinder top 6 within attachment shaft 1. Upper stop 5 (preferably a washer of appropriate diameter) is attached to the upper end of strut 8 by welding or other secure means to provide a downward limit on the motion of strut 8 within attachment shaft 1. Lower stop 4 (also preferably a washer of appropriate diameter) is welded or otherwise securely attached to strut 8 at the point on the vertical portion of strut 8 where it is even with the bottom of cylinder 2 and attachment shaft 1. Coil spring 3 is thus trapped between the top of cylinder 2 and lower stop washer 4. During manufacture, the ideal order of assembly would be to first attach lower stop 4 to strut 8, then place coil spring 3 upon strut 8 above lower stop 4, then insert strut 8 into cylinder 2, then attach upper stop 5 at the top of strut 8 on the upper side of cylinder top 6, and then finally attach cylinder 2 within attachment shaft 1 with set screws 7.

The lower end of strut 8 is formed in a "C" fashion so as to receive wheel 9 on its lower end as shown in FIG. 1. Other configurations are possible, such as a straight longitudinal shape with a short turn forming the wheel axis. Preferably, wheel 9 may be formed of a single plastic piece for lightweight and durability, but alternatively wheel 9 could be of other configurations, such as a rubber wheel on an aluminum rim. Wheel 9 may be attached to strut 8 by means of a locking pin, or any of a number of alternative well-known connection means that will allow wheel 9 to freely turn on strut 8 while holding wheel 9 securely in place so that it does not slip from strut 8. It will be apparent to those skilled in the art that this design will allow wheel 9 of the preferred embodiment to easily turn in any desired direction due to the rotation of shaft 8 within cylinder 2.

Attachment shaft 1 is fastened to the shaft of trimmer T by means of an adjustable bracket 11. Adjustable bracket 11 is formed of two pieces, whose faces are cut in a starburst pattern to securely engage one another as shown in FIG. 3. A bolt 24 holds adjustable bracket 11 in position by passing through bracket washer 23, then through the hole in the center of adjustable bracket 11, and then engages on the other side of adjustable bracket 11 with nut 21 after passing through bracket lock washer 22. The two pieces of bracket 11 are held securely but removably in place on attachment shaft 1 and the support shaft of trimmer T by means of clamps (composed of parts as described below). A clamp is attached to each end of each piece of adjustable bracket 11 by a bracket clamp bolt 16. Each clamp is formed of straight clamp face 14, which is connected to one piece of adjustable bracket 11 by bracket damp bolt 16; curved clamp face 12, which fits over attachment shaft 1 or the support shaft of trimmer T; and two clamping bolts 16 each coupled with a damping nut 20. When clamping bolts 16 are tightened in damping nuts 20, they pull straight clamp face 14 toward curved clamp face 12, thereby locking either attachment shaft 1 or the support shaft of trimmer T in place as applicable. It should be noted that although the particular attachment mechanism described herein is used in the preferred embodiment of the present invention, other secure attachment means may be substituted in alternative embodiments of the invention.

It should be apparent to one skilled in the art from the description provided herein and from FIGS. 1 and 3 that the means by which attachment shaft 1 is connected to the support shaft of trimmer T is highly configurable. The angle of attachment shaft 1 with respect to the support shaft of trimmer T may be adjusted by loosening bracket bolt 24 and repositioning the faces of the two pieces of bracket 11 with respect to each other. This allows the operator to adjust attachment shaft 1 to be vertical with respect to the ground during operation of trimmer T, no matter what angle the support shaft of trimmer T forms with the ground. Thus the preferred embodiment may be used with many common trimmer designs, including both those that include straight support shafts and those that include curved support shafts. Attachment shaft 1 may be easily raised and lowered with respect to the support shaft of trimmer T by simply loosening and retightening those of damping bolts 16 that hold attachment shaft 1 to its corresponding piece of adjustable bracket 11. This feature allows the operator to easily adjust the height at which the head of trimmer T is set to operate with the preferred embodiment of the present invention. Similarly, attachment shaft 1 may be easily repositioned horizontally with respect to the support shaft of trimmer T by loosening and retightening those of clamping bolts 16 that hold the support shaft of trimmer T to its corresponding piece of adjustable bracket 11. By a combination of these adjustment mechanisms, the operator may easily reposition attachment shaft 1 for different purposes, as, for example, due to varying terrain over which the trimmer is used.

During operation of the weed trimmer, the advantages provided by coil spring 3 and the related structure of the preferred embodiment of the present invention will be apparent from FIGS. 1 and 2. The force constant of coil spring 3 is sufficient that upper stop washer 5 is resiliently held in place against the upper side of the top of cylinder 2 by the force of coil spring 3 pressing against lower stop washer 4 attached to strut 8. The force constant of coil spring 3 is not so great, however, that coil spring 3 cannot provide some absorption of the vibration created by the operation of trimmer T. In addition, as wheel 9 travels across the ground and strikes rocks, holes, and other obstacles or uneven surfaces, the force of such impacts will temporarily compress coil spring 3, thereby providing a leveling and shock absorbing function with respect to the operation of trimmer T. Finally, the force constant of coil spring 3 is sufficiently small that the operator may easily expert downward pressure on trimmer T to compress coil spring 3 sufficiently to cause the trimmer head of trimmer T to strike the ground, thereby releasing more monofilament line as desired from time to time. This structure allows the preferred embodiment to achieve all of the advantages of the present invention over prior art devices. Specifically, the operator is able to perform all of the functions that he or she otherwise could perform with trimmer T as if the invention were not being employed, and yet still gains the advantages of reduced strain and vibration-induced symptoms common to those who use weed trimmers for a prolonged period of time.

The present invention has been described with reference to certain preferred and alternative embodiments that are intended to be exemplary only and not limiting to the full scope of the present invention as set forth in the appended claims.

What is claimed is:

1. A wheeled attachment for a weed trimmer, said attachment comprising:
   (a) a shaft;
   (b) a rotational member attached to said shaft;
   (c) a coil spring in communication with said shaft and said rotational member, wherein said spring biases said rotational member downwardly with respect to said shaft, and wherein said spring has a force constant sufficiently high that said spring prevents the trimmer head from striking the ground during normal operation, but sufficiently low that an operator may depress the trimmer and thereby strike the trimmer head against the ground in order to release trimmer line from the trimmer head;
   (d) a wheel attached to said rotational member;
   (e) a bracket connecting said shaft to the weed trimmer, wherein said bracket is adjustable with respect to the angle of said shaft to said trimmer; and
   (f) a cylinder fitted circumferentially within said shaft, wherein said coil spring fits within said cylinder and a portion of said rotational member passes through said cylinder.

2. The attachment of claim 1, wherein said rotational member further comprises an upper stop and a lower stop, and wherein the travel of said rotational member within said cylinder is limited such that said lower stop cannot travel above said cylinder and said upper stop cannot travel down through said cylinder.

3. An attachment for a weed trimmer wherein the weed trimmer comprises a motor unit, a trimmer head, and a support shaft therebetween, and further wherein the trimmer head comprises a line extension means activated by tapping of the trimmer head against a surface, wherein said attachment comprises:
   (a) a hollow shaft comprising an upper and lower end;
   (b) a cylinder fitted circumferentially within said lower end of said shaft, wherein said cylinder comprises a top with a hole extending therethrough;
   (c) a wheel strut comprising:
      (i) a bar extending through said cylinder along the longitudinal axis of said cylinder,
      (ii) an upper strut stop attached to said strut above the hole in said cylinder top, wherein said upper strut stop is larger in diameter than the hole in said cylinder top; and
      (iii) a lower strut stop attached to said strut below the hole in said cylinder top;
   (d) a coil spring fitted within said cylinder between said cylinder top and said lower strut stop, wherein the diameter of said coil spring is less than the diameter of said lower strut stop;
   (e) a wheel rotatably mounted on said strut bar;
   (f) a bracket, wherein said bracket comprises a first bracket member and a second bracket member, and wherein said bracket members each comprise a face comprising a plurality of grooves and ridges formed in a starburst pattern, wherein said bracket members are at said faces at one of a plurality of possible angles between said bracket members, and wherein said first bracket member is mounted to the weed trimmer support shaft and said second bracket member is mounted to said longitudinal support; and wherein said spring has a force constant sufficiently high that said resilient member prevents the trimmer head from striking the ground during normal operation, but sufficiently low that an operator may depress the trimmer and thereby strike the trimmer head against the ground in order to release trimmer line from the trimmer head.

* * * * *